United States Patent
Morita et al.

[11] Patent Number: 5,915,092
[45] Date of Patent: Jun. 22, 1999

[54] COMMUNICATIONS CONTROL SYSTEM FOR TRANSFERRING COMMANDS/STATUS DATA IN BATCH BETWEEN PROCESSORS UTILIZING TRANSMITTING PROCESSOR'S COMMAND ACTIVATION ORDER AND RECEIVING PROCESSOR'S ACCESS CONTROL

[75] Inventors: Sumie Morita; Kiyohumi Mitsuze; Ryouzi Takano; Kenichi Okabe; Katsuaki Akama, all of Kawasaki, Japan

[73] Assignee: Fujitsu Limited, Kanagawa, Japan

[21] Appl. No.: 08/929,722

[22] Filed: Sep. 15, 1997

Related U.S. Application Data

[63] Continuation of application No. 08/382,987, Feb. 3, 1995, abandoned.

[30] Foreign Application Priority Data

Mar. 25, 1994 [JP] Japan ................................ 6-056050

[51] Int. Cl.⁶ .............................. G06F 13/04; G06F 15/16
[52] U.S. Cl. ................................ 395/200.43; 395/200.46; 395/200.75; 395/671; 395/846; 370/85.6
[58] Field of Search .................................. 395/825, 872, 395/885, 842, 834, 671, 200.43, 200.46, 200.75, 853, 855, 846; 370/85.6

[56] References Cited

U.S. PATENT DOCUMENTS

| | | |
|---|---|---|
| 4,527,233 | 7/1985 | Ambrosius, III et al. .............. 364/200 |
| 4,651,298 | 3/1987 | Currier, Jr. ............................... 395/734 |
| 4,658,351 | 4/1987 | Teng ......................................... 395/650 |
| 4,819,154 | 4/1989 | Stiffler et al. ........................ 395/182.18 |
| 4,901,232 | 2/1990 | Harrington et al. ..................... 395/826 |
| 4,914,653 | 4/1990 | Bishop et al. ........................... 370/85.6 |
| 5,179,660 | 1/1993 | Devany et al. ..................... 395/200.09 |
| 5,185,864 | 2/1993 | Bonevento et al. ..................... 395/868 |
| 5,218,680 | 6/1993 | Farrell et al. ....................... 395/200.06 |
| 5,233,606 | 8/1993 | Pashan et al. .......................... 370/85.6 |
| 5,260,933 | 11/1993 | Rouse ........................................ 370/14 |
| 5,317,692 | 5/1994 | Ashton et al. .......................... 395/872 |
| 5,394,526 | 2/1995 | Crouse et al. .......................... 395/200 |
| 5,404,548 | 4/1995 | Nishioka ................................. 395/800 |
| 5,436,892 | 7/1995 | Tago et al. ............................... 370/60 |
| 5,473,143 | 12/1995 | Vak et al. ................................. 235/380 |
| 5,640,596 | 6/1997 | Takamoto et al. ....................... 395/841 |
| 5,685,012 | 11/1997 | Klein ....................................... 395/834 |

*Primary Examiner*—Thomas C. Lee
*Assistant Examiner*—Rehana Perveen
*Attorney, Agent, or Firm*—Helfgott & Karas, P C.

[57] ABSTRACT

An ATM switch system performs a DMA (direct memory access) transfer of a command and status data between a call processor and a processor of a communications control device via a peripheral interface. An inter-processor DMA transfer controller of the communications control device controls a DMA transfer between its memory and the main memory of a call processor for expediting communications between the two processors.

18 Claims, 22 Drawing Sheets

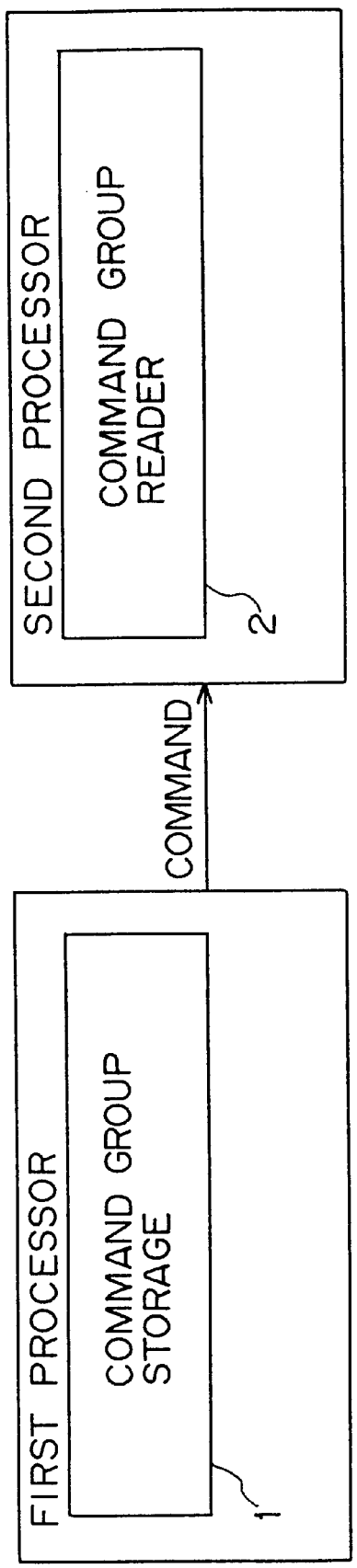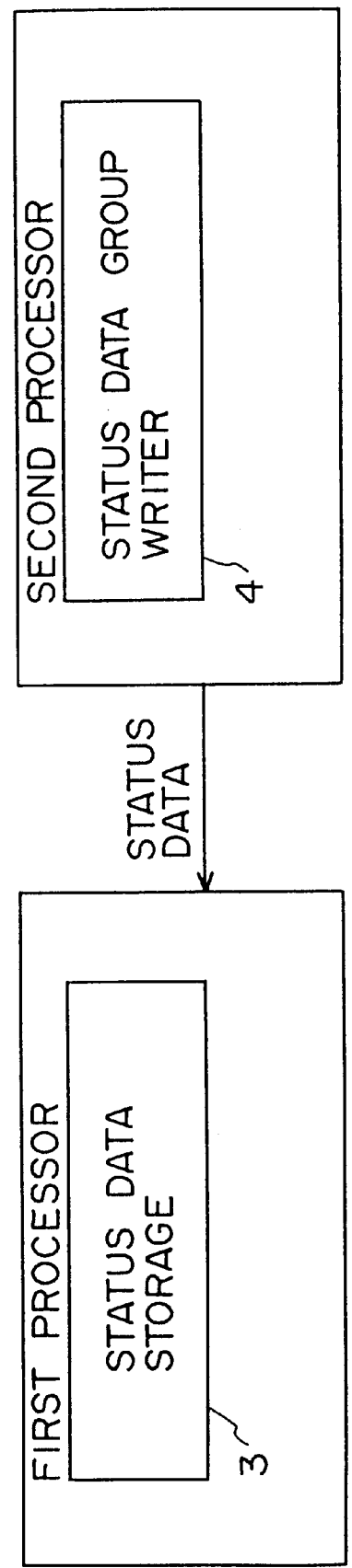
FIG. 1A
FIG. 1B

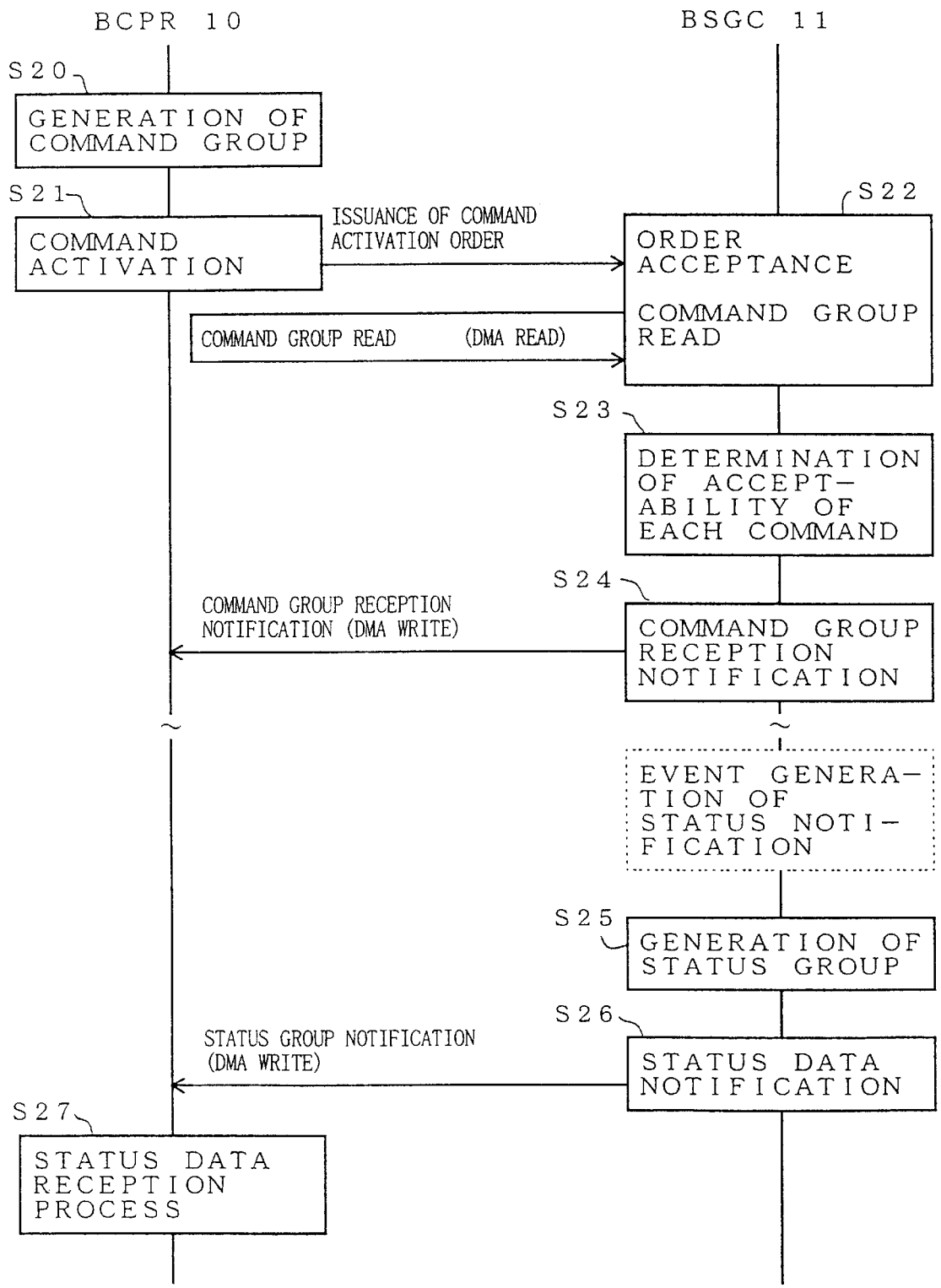
F I G. 5

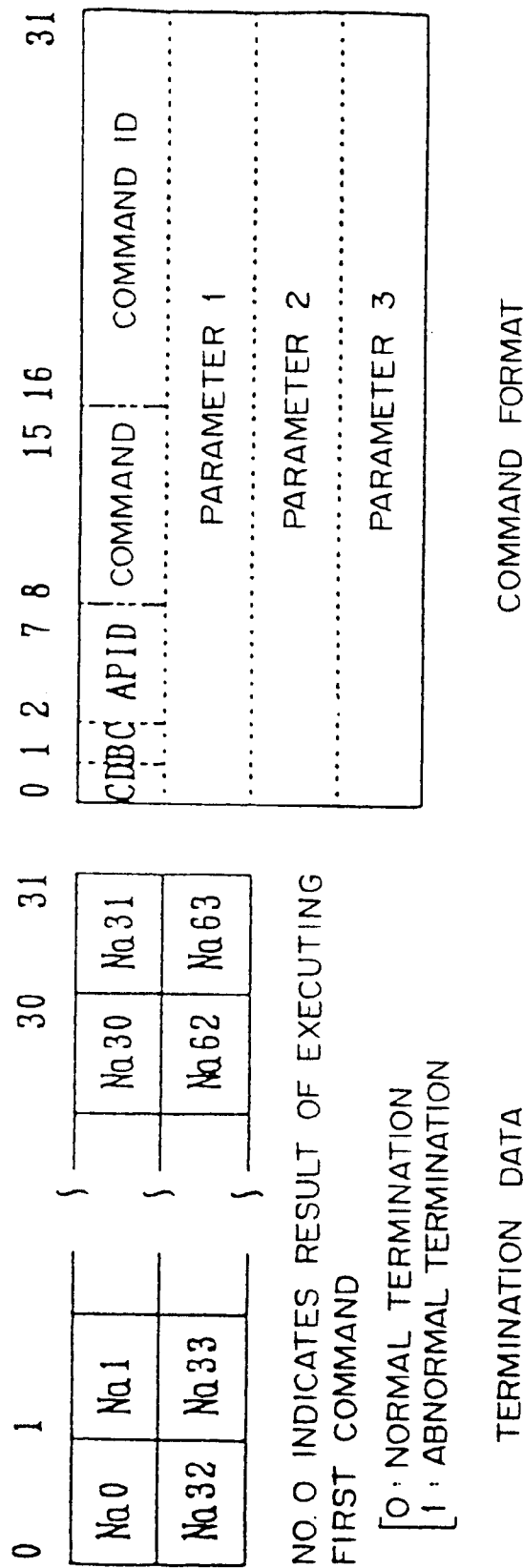
FIG. 8B COMMAND FORMAT
FIG. 8A TERMINATION DATA

| FIELD NAME | CONTENT |
|---|---|
| CHAIN DATA (CD) | WITHOUT CHAIN DATA DESIGNATION (0) / WITH CHAIN DATA DESIGNATION (1) |
| BUFFER COMMAND (BC) | WITHOUT BUFFER (0) / WITH BUFFER (1) |
| APID | SET APPLICATION TYPE |
| COMMAND | SET COMMAND TYPE |
| COMMAND ID | DESIGNATE COMMAND IDENTIFIER. DESIGNATE COMMAND ID IN COMMAND EXECUTION STATUS REPORT. |
| PARAMETERS 1, 2 AND 3 | DESIGNATE COMMAND PARAMETERS. (LINK NUMBERS, TRANSMISSION BUFFER POINTER, MESSAGE LENGTH, ETC.) |

FIG. 9

| TYPES | ITEM NUMBERS | COMMAND NAMES | HEXA-DECIMAL VALUES | OUTLINES | ABBREVIATIONS |
|---|---|---|---|---|---|
| DEVICE CONTROL | 1 | ONLINE OPERATION ACTIVATION | 2 0 | SET ONLINE MODE | STARTRQ |
| | 2 | HEALTH CHECK ORDER | 2 1 | ACTIVATE HEALTH CHECK | HELTHRQ |
| | 3 | ISOL SET REQUEST | 2 2 | DESIGNATE ISOL | ISOLSET |
| | 4 | ISOL REMOVAL REQUEST | 2 3 | REMOVE ISOL | ISOLCLR |
| | 5 | COPY START REQUEST | 2 4 | INSTRUCT TO START COPYING BETWEEN SYSTEMS | COPYSTART |
| | 6 | COPY STOP REQUEST | 2 5 | STOP COPYING OPERATION BETWEEN SYSTEMS | COPYSTOP |
| | 7 | SYSTEM CHANGE REQUEST | 2 6 | INSTRUCT SYSTEM CHANGE | SWIREQ |
| | 8 | DETAILED FAULT DATA INQUIRY | 2 7 | ENQUIRE DETAILED FAULT DATA | FLTDATARQ |
| | 9 | DETAILED MSCN READOUT REQUEST | 2 8 | ENQUIRE DETAILED MSCN FAULT DATA | MSCNDATARQ |
| | 1 0 | LED CONTROL | 2 C | CONTROL BSGC AND BSGC-COM | LEDCNTL |
| | 1 1 | SYNSH SYSTEM SELECTION DATA CONTROL | 2 D | WRITE IN AND READ OUT SYNSH | SYNSHRQ |
| | | | | | |
| PIF CONTROL | 1 | PIF INITIAL DATA REGISTRATION | 0 0 | SET PIF INITIAL DATA | PIFINF |
| | 2 | RECEPTION BUFFER REGISTRATION (EMERGENCY) | 1 0 | REGISTER EMERGENCY RECEPTION BUFFER | RBUFR1RQ |
| | 3 | RECEPTION BUFFER REGISTRATION (PRIORITY) | 1 1 | REGISTER PRIORITYY RECEPTION BUFFER | RBUFR2RQ |
| | 4 | RECEPTION BUFFER REGISTRATION (NON-PRIORITY) | 1 2 | REGISTER NON-PRIORITY RECEPTION BUFFER | RBUFR3RQ |
| | | | | | |
| | | | | | |

FIG. 10

| CD | BC | APID | STATUS | COMMAND ID |
|----|----|------|--------|------------|
| 0 | 1 2 | 7 8 | 15 16 | 31 |
| | | | PARAMETER 1 | |
| | | | PARAMETER 2 | |
| | | | PARAMETER 3 | |

FIG. 11

| FIELD NAME | CONTENT |
|---|---|
| CHAIN DATA (CD) | WITHOUT CHAIN DATA DESIGNATION (0) / WITH CHAIN DATA DESIGNATION (1) |
| BUFFER COMMAND (BC) | WITHOUT BUFFER (0) / WITH BUFFER (1) |
| APID | SET APPLICATION TYPE |
| STATUS | SET STATUS DATA TYPE |
| COMMAND ID | DESIGNATE COMMAND IDENTIFIER. USE COMMAND ID IN COMMAND EXECUTION STATUS REPORT. USE 0 IN ASYNCHRONOUS NOTIFICATION OF RECEPTION MESSAGE AND SO FORTH. |
| PARAMETERS 1, 2 AND 3 | DESIGNATE STATUS PARAMETERS. (LINK NUMBERS, TRANSMISSION BUFFER POINTER, MESSAGE LENGTH, ETC.) |

FIG. 12

| TYPES | ITEM NUMBERS | STATUS NAMES | HEXA-DECIMAL VALUES | OUTLINES | ABBREVIATIONS |
|---|---|---|---|---|---|
| DEVICE CONTROL | 1 | ONLINE OPERATION RESPONSE | A 0 | NOTIFY COMPLETION OF INITIALIZATION OF ONLINE OPERATION | STARTCNF |
| | 2 | HEALTH CHECK RESPONSE | A 1 | NOTIFY HEALTH CHECK | HEALTHCNF |
| | 3 | ISOL SET RESPONSE | A 2 | NOTIFY RECEPTION OF ISOL SETTING | ISOLSETCNF |
| | 4 | ISOL REMOVAL RESPONSE | A 3 | NOTIFY RECEPTION OF ISOL REMOVAL | ISOLCLRCNF |
| | 5 | COPY COMPLETION NOTIFICATION | A 4 | NOTIFY COMPLETION OF COPYING BETWEEN SYSTEMS | COPYCNF |
| | 6 | COPY STOP RESPONSE | A 5 | NOTIFY STOP OF COPYING OPERATION BETWEEN SYSTEMS | COPYSTOPCNF |
| | 7 | SYSTEM CHANGE RESPONSE | A 6 | NOTIFY RECEPTION OF SYSTEM CHANGE REQUEST | SWICNF |
| | 8 | SYSTEM CHANGE COMPLETION | A 9 | NOTIFY COMPLETION OF SYSTEM CHANGE PROCESS | SWIEND |
| | 9 | DETAILED FAULT DATA NOTIFICATION | A 7 | NOTIFY RESULT OF INQUIRING DETAILED FAULT DATA | FLTINF |
| | 1 0 | REMOTE SYSTEM FAULT NOTIFICATION | A A | NOTIFY FAULT FACTOR OF REMOTE SYSTEM | SBYFLTIND |
| | 1 1 | DETAILED MSCN READOUT RESPONSE | A 8 | NOTIFY DETAILED MSCN FAULT DATA | MSCNDATACNF |
| | 1 2 | BSGC CONGESTION | A B | NOTIFY CONGESTION OF PROCESSES WITHIN BSGC | BSGCBUSYIND |
| | 1 3 | LED CONTROL RESPONSE | A C | NOTIFY RESPONSE OF LED CONTROL | LEDCNTLCNF |
| | 1 4 | SYNSH SYSTEM SELECTION DATA RESPONSE | A D | NOTIFY RESPONSE OF SYNSH SYSTEM SELECTION DATA | SYNSHCNF |
| | | | | | |
| PIF CONTROL | 1 | PIF INITIAL DATA RESPONSE | 8 0 | NOTIFY ACCEPTANCE OF PIF INITIAL DATA | PIFCNF |
| | 2 | RECEPTION BUFFER RESPONSE (EMERGENCY) | 9 0 | NOTIFY ACCEPTANCE OF REGISTERING EMERGENCY RECEPTION BUFFER | RBUFR1CNF |
| | 3 | RECEPTION BUFFER RESPONSE (PRIORITY) | 9 1 | NOTIFY ACCEPTANCE OF REGISTERING PRIORITY RECEPTION BUFFER | RBUFR2CNF |

FIG. 13

| BIT | CONTENTS |
|---|---|
| 3 1 | INDICATION OF RESET COMPLETION |
| 3 0 | MEANINGLESS (DON'T CARE) |
| 2 9 | BSGC FAULT |
| 2 8 | DMA ACCESS ERROR 1 (GENERATION OF ANSWER ER 1) |
| 2 7 | DMA ACCESS ERROR 2 (GENERATION OF ANSWER ER 2) |
| 2 6 | DMA PARITY ERROR |
| 2 5 | DMA TIME-OVER |
| 2 4 | HPAL: HOME BSGC-COM OBP FAULT |
| 2 3 | MPAL: MATE BSGC-COM OBP FAULT |
| 2 2 | MFAL: MATE FUSE ALARM (REMOTE SYSTEM LOADED WITH HPT01A, FUSE CUT OFF) |
| 2 1 | LOCAL SYSTEM BSGC COM FAULT 1  ☆ONLY BSGC WITH LEAST NUMBER IS VALID. |
| 2 0 | REMOTE SYSTEM BSGC COM FAULT 1  ☆ONLY BSGC WITH LEAST NUMBER IS VALID. |
| 1 9 | LOCAL SYSTEM BSGC COM FAULT 2 |
| 1 8 | REMOTE SYSTEM BSGC COM FAULT 2 |
| 1 7 | MEANINGLESS (DON'T CARE) |
| 1 6 | MEANINGLESS (DON'T CARE) |
| 1 5 | BSGC TO LOCAL SYSTEM BSGC-COM HAS BSGC-COM DETECTION FAULT. DATA PARITY N.G. |
| 1 4 | BSGC TO LOCAL SYSTEM BSGC-COM HAS BSGC-COM DETECTION FAULT. CELL FRAME CUT OFF OR CLOCK CUT OFF. |
| 1 3 | MEANINGLESS (DON'T CARE) |
| 1 2 | BSGC TO REMOTE SYSTEM BSGC-COM HAS BSGC-COM DETECTION FAULT. DATA PARITY N.G. |
| 1 1 | BSGC TO REMOTE SYSTEM BSGC-COM HAS BSGC-COM DETECTION FAULT. CELL FRAME CUT OFF OR CLOCK CUT OFF. |
| 1 0 | MEANINGLESS (DON'T CARE) |
| 0 9 | LOCAL SYSTEM TO BSGC BSGC-COM HAS BSGC DETECTION FAULT. DATA PRRITY N.G. |
| 0 8 | LOCAL SYSTEM TO BSGC BSGC-COM HAS BSGC DETECTION FAULT. CELL FRAME CUT OFF OR CLOCK CUT OFF. |
| 0 7 | MEANINGLESS (DON'T CARE) |
| 0 6 | REMOTE SYSTEM TO BSGC BSGC-COM HAS BSGC DETECTION FAULT. DATA PARITY N.G. |
| 0 5 | REMOTE SYSTEM TO BSGC BSGC-COM HAS BSGC DETECTION FAULT. CELL FRAME CUT OFF OR CLOCK CUT OFF. |
| 0 4 | MEANINGLESS (DON'T CARE) |
| 0 3 | MEANINGLESS (DON'T CARE) |
| 0 2 | MEANINGLESS (DON'T CARE) |
| 0 1 | MEANINGLESS (DON'T CARE) |
| 0 0 | MEANINGLESS (DON'T CARE) |

FIG. 18

COMMUNICATIONS CONTROL SYSTEM FOR TRANSFERRING COMMANDS/STATUS DATA IN BATCH BETWEEN PROCESSORS UTILIZING TRANSMITTING PROCESSOR'S COMMAND ACTIVATION ORDER AND RECEIVING PROCESSOR'S ACCESS CONTROL

This is a continuation of application Ser. No. 08/382,987, filed Feb. 3, 1995 (now abandoned).

BACKGROUND OF THE INVENTION

1. Field of the Invention

This invention pertains to an inter-processor communications control system, and more specifically to an inter-processor communications control system between a call processor and a processor of a communications control device for controlling ATM communications e.g. for use in an ATM switch.

2. Description of the Related Arts

Ever since the CCITT (Consultative Committee on International Telephone & Telegram) endorses an asynchronous transfer mode (ATM) switch system as a standard exchange system of the next generation, its researches have actively conducted especially on the technology for realizing a broadband ISDN (Integrated Services Digital Network).

Such an ATM switch system often has many devices capable of realizing various functions located large distances away. It is necessary to efficiently realize communications among the processors of respective devices, for improving the quality and reliability in processing a fault and in connecting paths throughout an ATM switch system.

Such an ATM switch system was initially implemented as on a system having direct bus connections among processors e.g. between a call processor and a processor of a communications control device for controlling communications in the systems. In such a case, an inter-processor communications control is rather simple, which can be realized chiefly by the functions of a call processor.

However, when the distance between the call processor and the communications control device is large and a cable connects two processors, since a communications speed becomes slow and communications capacities are limited in such communications, it is required of more efficiently transmitting data between the call processor and the communications control device.

SUMMARY OF THE INVENTION

This invention aims at improving the efficiency in transferring commands and status data,etc. between two processors, for example, a call processor and a processor of a communications control device for use in an ATM switch system.

In an ATM switch system a DMA (direct memory access) transfer of a command and a status data is performed between the call processor and the processor of a communications control device via a peripheral interface.

The communications control device is provided with an inter-processor DMA transfer controller for controlling a DMA transfer between its memory and the main memory of a call processor.

The call processor generates in the main memory a command group comprising plural commands for a communications control device, and issues a command activation order to the communications control device.

Upon receiving the command activation order, the communications control device reads in a batch the command group in the main memory, by using a port inside of an inter-processor DMA transfer controller. Since the communications control device receives from the call processor plural commands in a single DMA read operation, their transfer time is reduced. This invention reduces the transfer time of plural commands and make it equivalent to that of a single command, instead of taking a transfer time proportional to the number of the commands by transmitting one command at a time.

The processor of the communications control device performs a predetermined process on each command belonging to a read-in command group. It is sometimes necessary, depending on the content of its command, to return to the call processor the processing result as status data. In such a case, the processor of the communications control device combines plural sets of status data generated in a predetermined duration as a status data group. Then, the processor of the communications control device writes the status data group in a batch to the main memory of the call processor, by using a port inside of an inter-processor DMA transfer controller. Since a single DMA write operation allows the communications control device to write plural sets of status data into the call processor, a transfer time of the status data is reduced as well.

The main memory of the call processor has three status queues comprising an emergency status queue, a priority status queue and a non-priority status queue, in correspondence with the different degrees of status data priorities. The call processor looks in these status queues e.g. respectively at intervals of 8 ms=(milliseconds), 16 ms and 80 ms, for checking status data. Therefore, the higher the degree of their priority is, the earlier the call processor detects status data.

BRIEF DESCRIPTION OF THE DRAWINGS

One of an ordinary skill in the art can easily understand additional features and objects of this invention from the description of the preferred embodiments and the attached drawings.

In the drawings:

FIG. 1A is a block diagram illustrating a principle underlying a command transfer system for transferring a command from a first processor to a second processor;

FIG. 1B is a block diagram illustrating a principle underlying a status data transfer system for transferring status data from a second processor to a first processor;

FIG. 5 is a schematic flowchart illustrating a command transfer and a status data transfer, pursuant to this invention;

FIG. 8A is an explanatory diagram illustrating termination data;

FIG. 8B is an explanatory diagram illustrating a command format;

FIG. 9 is an explanatory diagram illustrating a command function;

FIG. 10 is an explanatory diagram illustrating concrete examples of commands;

FIG. 11 is a format diagram illustrating the format of status data;

FIG. 12 is an explanatory diagram illustrating a status data function;

FIG. 13 is an explanatory diagram illustrating concrete examples of status data;

FIG. 18 is an explanatory diagram illustrating thirty-two bits of MSCN data stored in a communications control device;

DESCRIPTION OF THE PREFERRED EMBODIMENT

Figure 2:
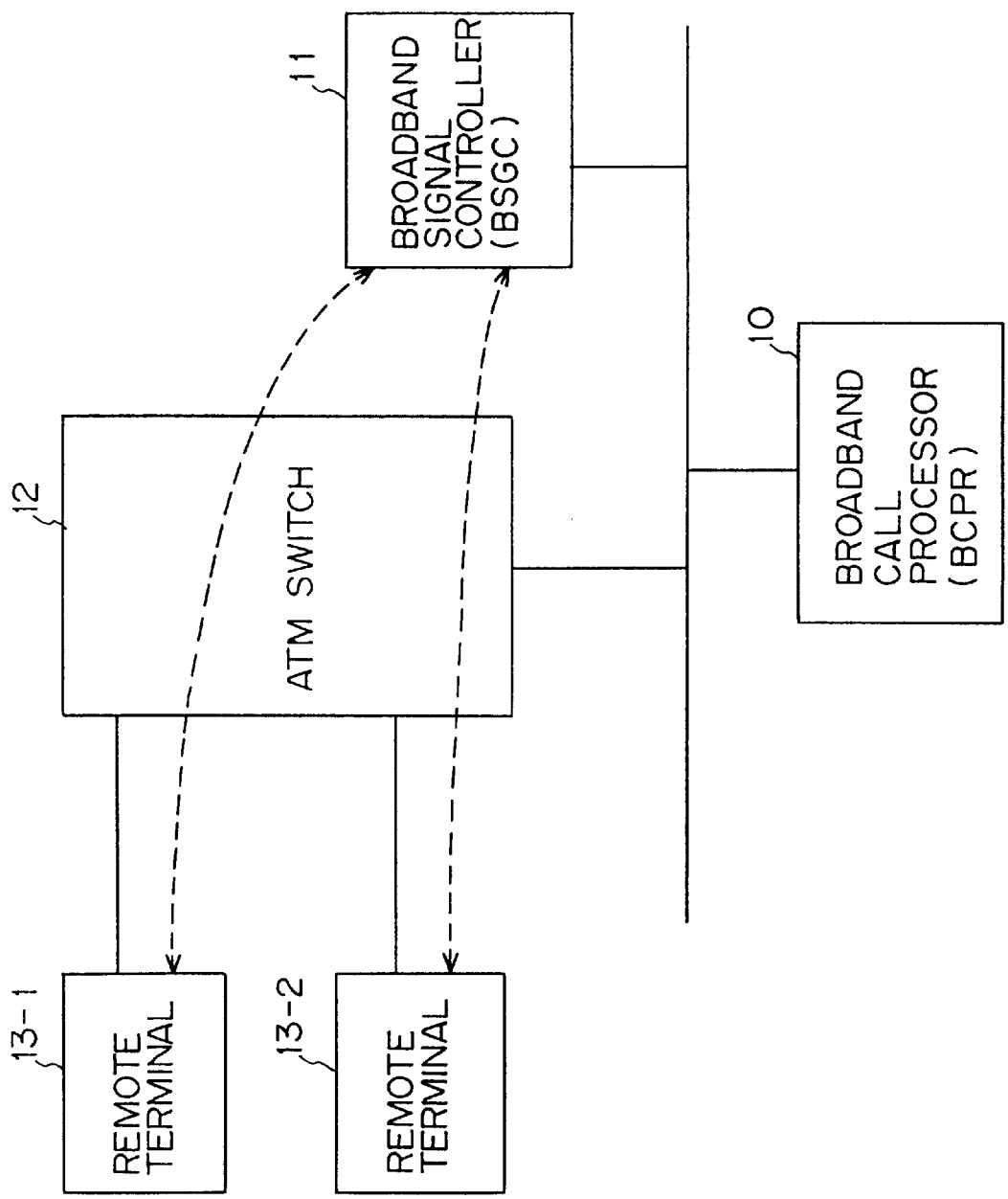
FIG. 2 is a block diagram illustrating the global configuration of an ATM switch system using an inter-processor communications control system of this invention.

A preferred embodiment of this invention is described below with reference to the attached drawings.

FIGS. 1A and 1B show principles of this invention for a communications control system between two processors, in which a first processor is a call processor, and a second processor is a processor of a communications control device, for example.

FIG. 1A is a block diagram illustrating a principle underlying a command transfer system for transferring a command from the first processor to the second processor.

A command group storage 1 provided in the first processor stores a command group comprising plural commands to be transmitted to the second processor.

A command group reader 2 provided in the second processor reads through a direct memory access (DMA) in a batch a command group in the command group storage 1, in accordance with the reception of a command activation order from the first processor.

FIG. 1B is a block diagram illustrating a principle underlying a status data transfer system for transferring status data from the second processor to the first processor.

A status data storage 3 provided in the first processor stores status data transmitted from the second processor, such as a result of executing a command having been transmitted to the second processor from the first processor. A status data group writer 4 provided in the second processor combines more than one set of status data to be transmitted to the first processor e.g. as a status data group in a predetermined duration, and writes through a direct memory access them in a batch into the status data storage 3.

Returning to FIG. 1A, this invention enables the command group reader 2 to read through a direct memory access in a batch a command group comprising a plurality of commands stored in the command group storage 1. As well, the second processor contains a command group reception result notifier for immediately checking the acceptability of each command belonging to the command group by the second processor, e.g. whether or not the second processor has a buffer ready in case of a buffer command which is a command accompanied by data, thereby notifying the first processor of the acceptability of each command by a corresponding bit map.

This reduces the number of direct memory accesses, compared with a case in which commands are transmitted one by one and the acceptability of each command is notified each time.

Returning to FIG. 1B, only status data generated in a predetermined duration by the second processor belong to a status data group comprising more than one set of status data, which the status data writer 4 writes in a batch into the status data storage 3 in the first processor. For example, by structuring the status data storage 3 with three status queues comprising an emergency status queue, a priority status queue and a non-priority status queue, by preparing different three time intervals predetermined respectively for these three status queues, and by looking in the status data in the status queues at respective time intervals for these status queues, a control can be performed in accordance with the degree of status data priority.

As described above, this invention enables communications between processors to be performed by combining plural commands as a command group and plural sets of status data including a result of processing a command as a status data group.

FIG. 2 is a block diagram illustrating the global configuration of an ATM switch system using an inter-processor communications control system of this invention.

A system comprises a call processor (BCPR: broadband call processor) 10 for an ATM exchange, a communications control device (BSGC: broadband signal controller) 11 for controlling communications within the system, an ATM switch 12 for switching, and remote terminals 13-1 and 13-2 provided generally at large distances away.

Figure 3:
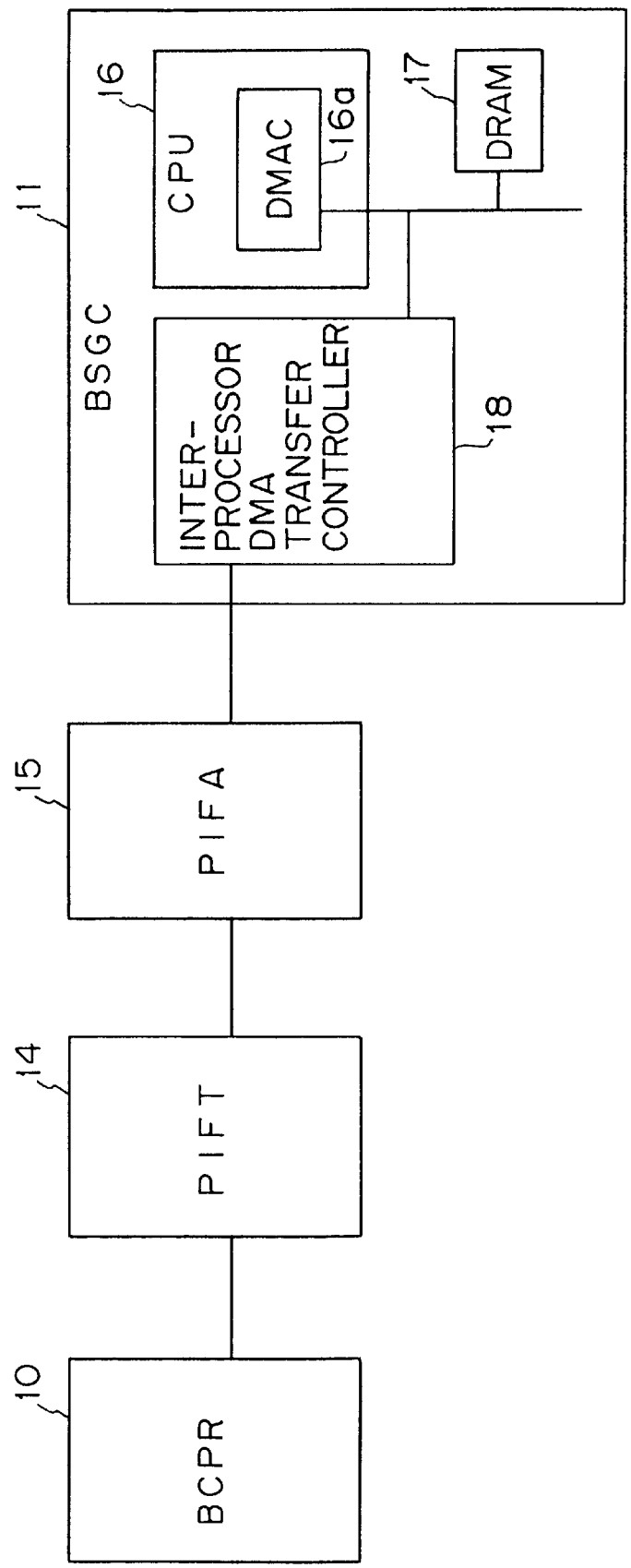
FIG. 3 is a block diagram illustrating a data transfer between a call processor and a communications control device.

FIG. 3 is a block diagram illustrating a data transfer between the call processor and the communications control device.

More specifically, FIG. 3 shows a communications control system for controlling communications between the broadband call processor (BCPR) 10 and the broadband signal controller (BSGC) 11 shown in FIG. 2.

A peripheral interface type T (PIFT) 14 and a peripheral interface type A (PIFA) 15 are connected to each other as interfaces between the BCPR 10 and the BSGC 11. The BSGC 11 comprises a CPU 16 including a DMAC (a direct memory access controller) 16a for controlling a direct memory access in the BSGC 11, a dynamic random access memory (DRAM) 17 and an inter-processor DMA transfer controller 18. The inter-processor DMA transfer controller 18, together with the DMAC 16a in the CPU 16, realizes a DMA data transfer between a memory in the BSGC 11 and a main memory in the BCPR 10.

Figure 4:
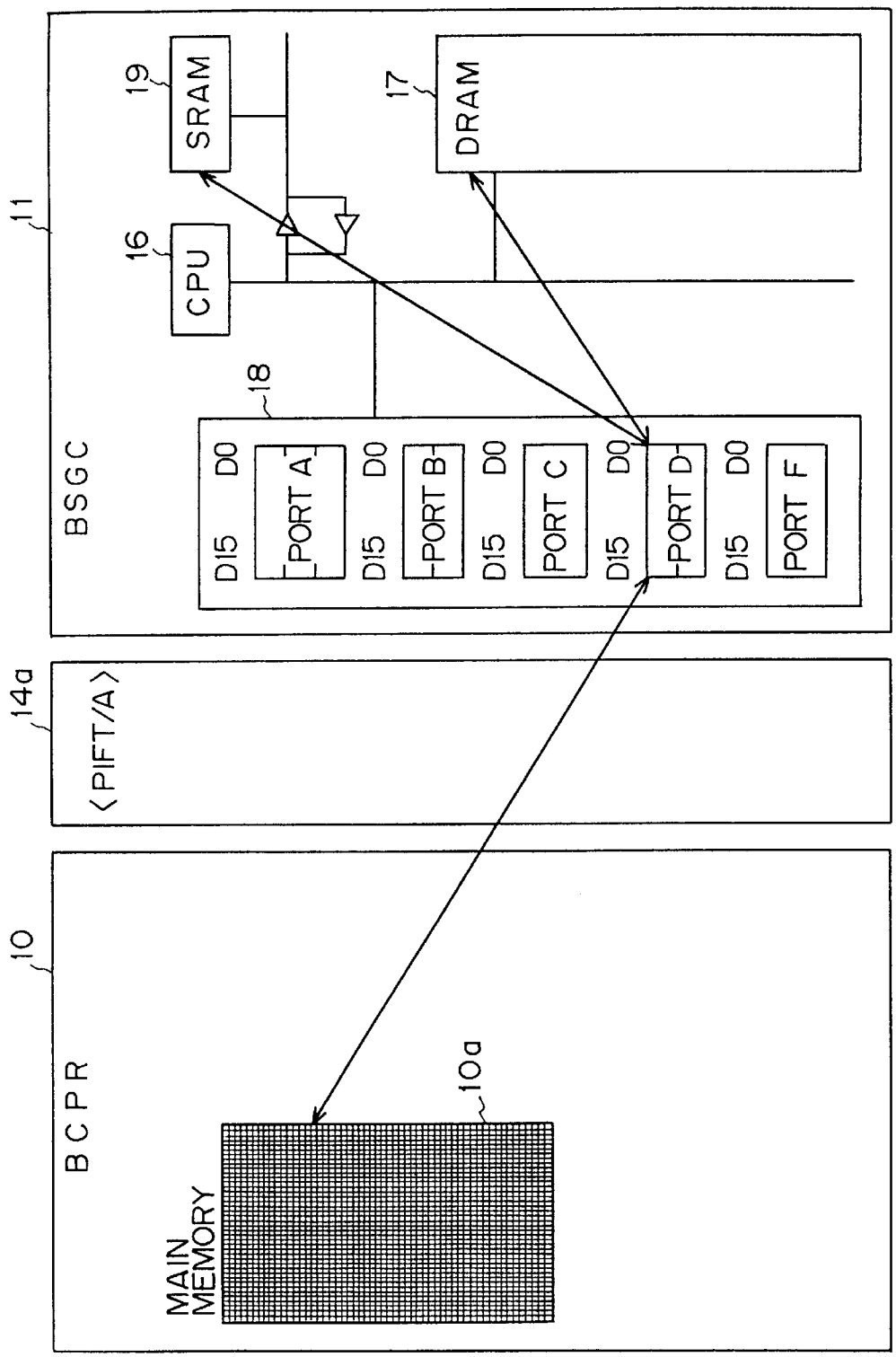
FIG. 4 is a block diagram illustrating a DMA data transfer between a call processor and a communications control device.

FIG. 4 shows a DMA data transfer between the BCPR 10 and the BSGC 11 by the inter-processor DMA transfer controller 18 shown in FIG. 3.

The inter-processor DMA transfer controller 18 comprises ports A, B, C, D and F. The BCPR 10 performs a data transfer via port D between its main memory 10a and the dynamic random access memory (DRAM) 17 or the static random access memory (SRAM) 19 in the BSGC 11. The command group stored in the main memory 10a and transmission data stored in a transmission buffer are transferred to the BSGC 11. The status data including a result of executing a command by the BSGC 11 are transferred from the DRAM 17 or the SRAM 19 to a status queue and a reception buffer in the main memory 10a.

FIG. 5 is a schematic flowchart illustrating a command transfer and a status data transfer, pursuant to this invention.

More specifically, FIG. 5 shows the outlines of a command group transfer method for transferring a command group from the BCPR 10 to the BSGC 11 and a status data group transfer method for transferring a status data group, including a result of executing a command, from the BSGC 11 to the BCPR 10.

Step S20: The BCPR 10 generates a command group comprising plural commands.

Step S21: The BCPR 10 issues a command activation order to the BSGC 11.

Step S22: The BSGC 11 reads out of the BCPR 10 the command group generated in step S20, in accordance with the reception of the command activation order. The inter-processor DMA transfer controller 18 shown in FIG. 3 controls reading the command group stored in the main memory 10a of the BCPR 10.

Step S23: The BSGC 11 determines the acceptability of each command. For example, in the case of a buffer command accompanied by data and indicating the necessity of a buffer ready to receive the data in the BSGC 11, the BSGC 11 determines the acceptability of the command depending on whether it can make a buffer therefore ready.

Step S24: Depending on the result of the determination in step S23, the BSGC 11 DMA writes (writes through a direct memory access) in a bit map format indicating the acceptability of the command a command group reception notification into the main memory 10a thereby completing a command transfer process.

Thus, this invention enables the BSGC 11 to receive from the main memory 10a of the BCPR 10 a plurality of commands combined as a single command group in a single DMA read operation. For example, assuming that the BCPR 10 generates a command every 2 ms and that a DMA read operation requires 0.5 ms, it takes 8.5 ms to DMA transfer four commands as a command group in a single batch, whereas it takes ten milliseconds [10 ms] to DMA transfer four commands one by one. Therefore, in this case, a DMA transfer of plural commands as a command group produces a net saving of 1.5 ms.

The BSGC 11 executes respective processes for received commands. For example, if a command is a simple command for transmitting data to either of the remote terminals 13-1 and 13-2 shown in FIG. 2, the BSGC 11 does not need to return to the BCPR 10 a result of executing the command, but need only notify the reception of a command group in step S24. However, the BSGC 11 may need to return to the BCPR 10 a result of processing a command as status data, depending on the content of the command.

Step S25: The BSGC 11 needs to transmit, as necessary, to the BCPR 10 data received from the remote terminals 13-1 and 13-2 as status data. When an event of such a status notification arises in FIG. 5, the BSGC 11 combines as a status data group plural sets of status data generated e.g. in 8 ms, as described later.

Step S26: The BSGC 11 DMA writes the status data group into a status queue in the main memory 10a of the BCPR 10 shown in FIG. 4.

Step S27: The BCPR 10 performs a status reception process in accordance with the content of the status queue.

Figure 6:
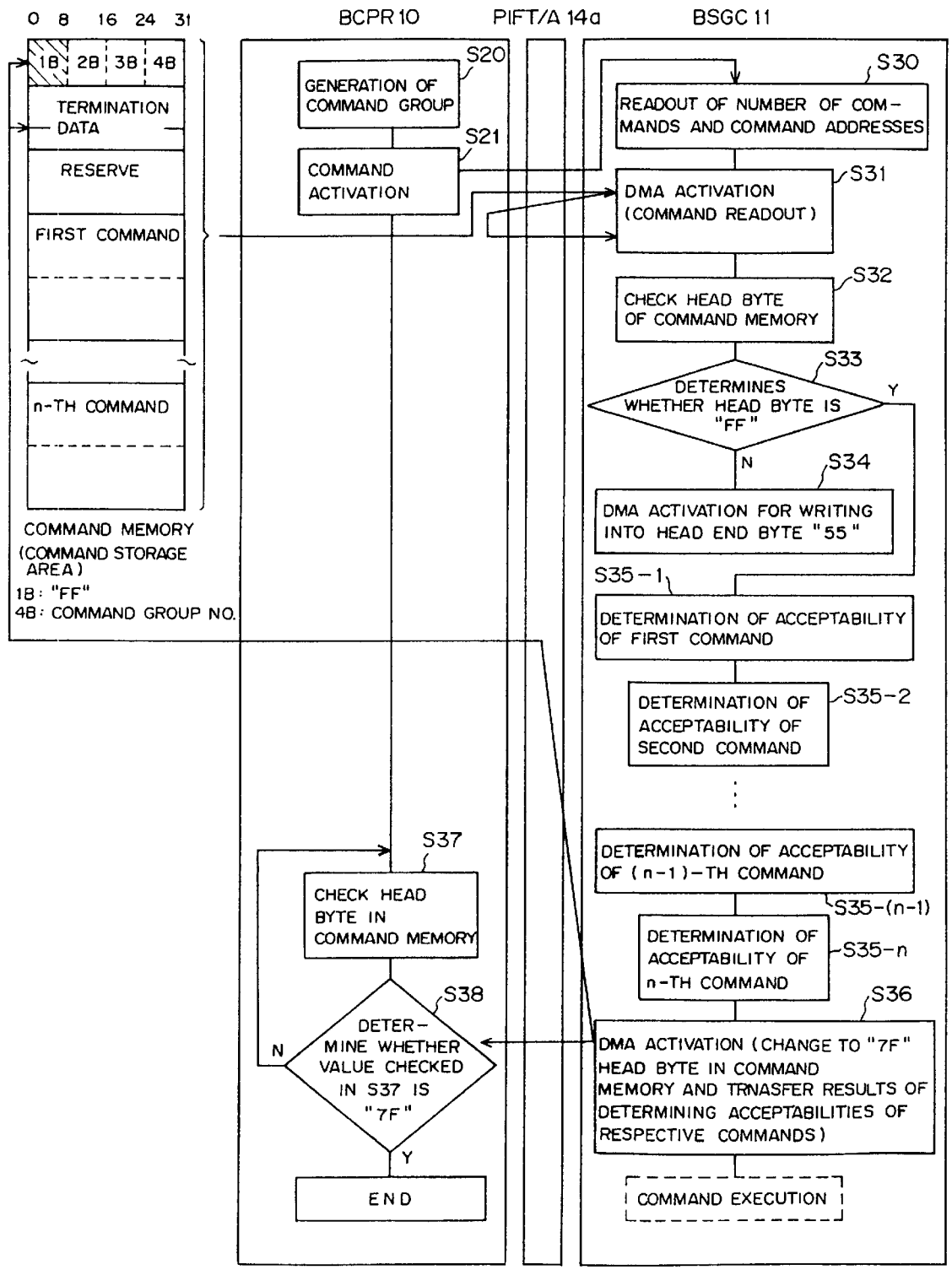
FIG. 6 is a detailed flowchart illustrating a command transfer from a call processor to a communications control device.

FIG. 6 shows a detailed flowchart illustrating a command group transfer method for transferring a command group from the BCPR 10 to the BSGC 11.

Steps shown in FIG. 6 which are the same as those shown in FIG. 5 have the same numbers.

Step S30: After the BCPR 10 generates a command group in step S20 and issues a command activation order in step S21, the BSGC 11 reads out the number of commands and command addresses.

Step S31: The BSGC 11 activates a DMA for reading out commands from the main memory 10a of the BCPR 10.

Step S32: The BSGC 11 checks a value of a head byte (1B) in the command storage area (command memory) in the main memory 10a.

Step S33: The BSGC 11 determines whether or not the value of the head byte is "FF" in a hexadecimal code.

The head byte of the command storage area indicates, as a DMA flag, whether or not the command group has already been processed. The value of the head byte being hexadecimal "FF" indicates that the BCPR 10 has newly generated the command group. The BSGC 11 reads the generated command group. After transmitting to the BCPR 10 the acceptability of the command group as termination data (described later), the BSGC 11 changes the value of the head byte to hexadecimal "7F".

Step S34: When the BSGC 11 determines negatively (N) in step S33 that the value of the head byte of the command storage area is not hexadecimal "FF", because the BCPR 10 has not newly generated the command group, the BSGC 11 activates a DMA for writing into the head byte hexadecimal "55" as a rejection code.

Steps S35-1 through S35-n: When the BSGC 11 determines positively (Y) in step S33 that the value of the head byte of the command storage area is "FF", the BSGC 11 determines the respective acceptabilities of first through n-th commands.

Step S36: The BSGC 11 activates a DMA for changing to "7F" the value of the head byte in the command storage area of the BCPR 10 and for writing as termination data the results of determining the acceptabilities of respective commands.

Then, the BSGC 11 executes the respective commands.

Step S37: After the command activation in step S21, the BCPR 10 periodically checks the value of the head byte in the command storage area of the main memory 10a.

Step S38: The BCPR 10 determines whether or not the value checked in step S37 is "7F". Upon determining negatively (N) that the value is not "7F", the BCPR 10 repeats processes on and after step S37, until determining positively (Y) that the value is "7F". After that the processes end. When the value of the head byte is "55", the BCPR 10 executes a fault process for the BSGC 11 or a process for matching the state of the BCPR 10 with that of the BSGC 11.

Figure 7:
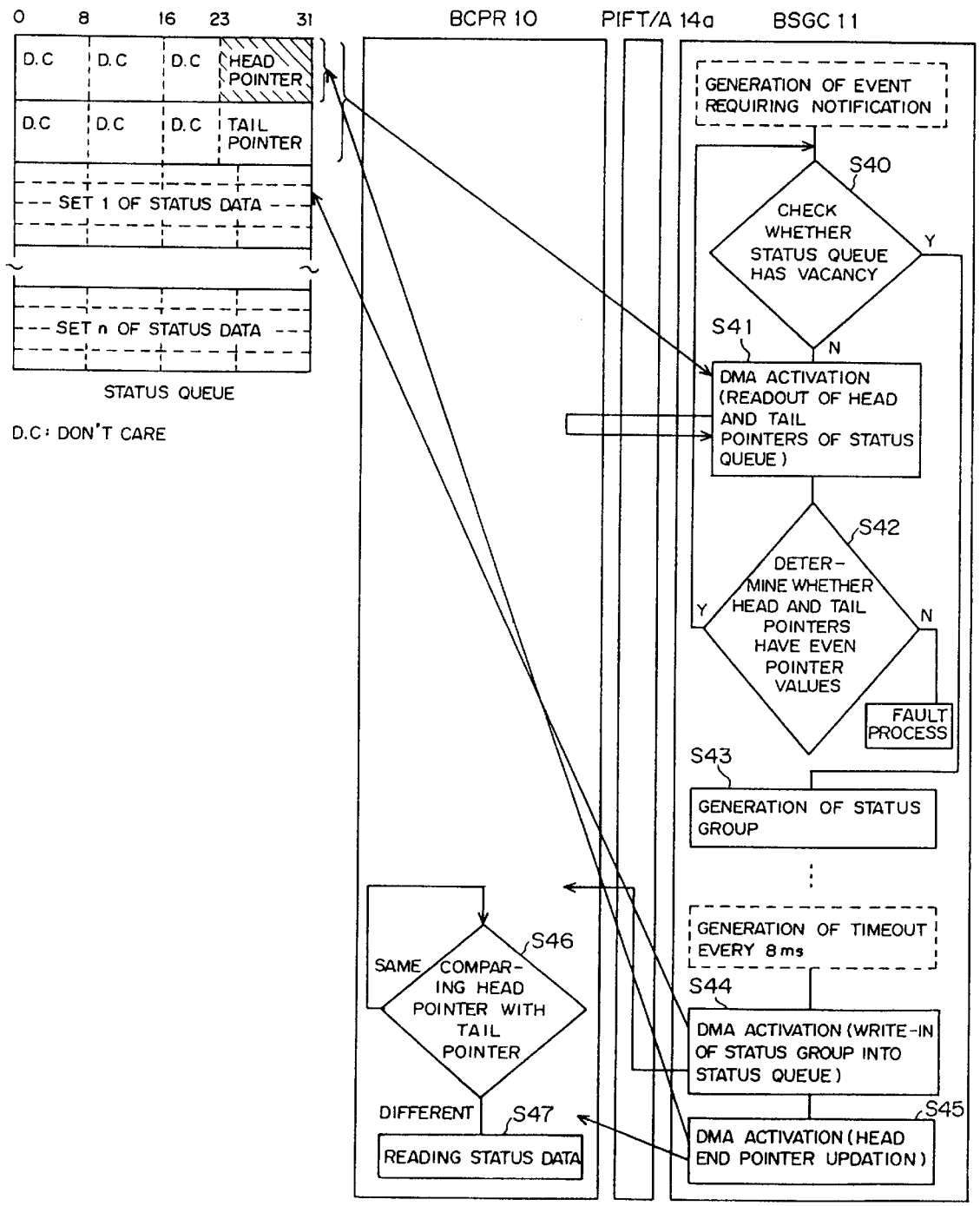
FIG. 7 is a detailed flowchart illustrating a status data transfer from a communications control device to a call processor.

FIG. 7 shows a detailed flowchart illustrating a status data group transfer method for transferring a status data group from the BSGC 11 to the BCPR 10.

Step S40: On generating an event requiring a notification to the BCPR 10, the BSGC 11 checks whether or not a status queue for storing status data in the main memory 10a of the BCPR 10 has a vacancy.

Step S41: Upon determining negatively (N) in step S40 that a status queue has no vacancy, the BSGC 11 activates a DMA for reading out the head pointer and the tail pointer of a status queue.

Step S42: The BSGC 11 determines whether or not these two pointers have even pointer values.

The head pointer points an address in a status queue at which status data transmitted next from the BSGC 11 are stored, while the tail pointer points an address in a status queue at which status data are taken out next from the main memory 10a of the BCPR 10.

Each of n sets of status data for status 1 through status n comprises e.g. four words. Since a pointer value is updated in an increment of four, when the BSGC 11 determines negatively (N) in step S42 that at least either one of these two pointers does not have an even pointer value, the BSGC 11 regards this as a fault occurrence and executes a fault process. When the BSGC 11 determines positively (Y) in step S42 that both of these two pointers have even pointer values, the BSGC 11 repeats processes on and after step S40, until a vacancy is produced in the status queue.

Step S43: Upon determining positively (Y) in step S40 that a status queue has a vacancy, the BSGC 11 generates a status data group. As described later, three status queues are provided inside of the main memory 10a of the BCPR 10 in correspondence with the degrees of status data priorities, which are an emergency status queue, a priority status queue, and a non-priority status queue. In correspondence with the degree of status data priority, the BSGC 11 writes status data into any of three status queues. The BSGC 11 also determines in step S40 whether each of these three status queues has a vacancy in correspondence with the degree of status data priority. Then, the BSGC 11 combines plural sets of status data as a status data group, upon a generation of a time-out e.g. every Bms. Alternatively, the BSGC 11 combines the sets of status data generated in a duration predetermined in correspondence with each of the status queues as the status data group.

Step S44: The BSGC 11 activates a DMA for writing a status data group into a status queue.

Step S45: The BSGC 11 activates a DMA for updating the head pointer in correspondence with the number of sets of status data written in step S44.

Step S46: The BCPR 10 compares the head pointer with the tail pointer. For each of the emergency status queue, the priority status queue, and the non-priority status queue a pointer comparison is performed at a different interval. As described later, for the emergency status queue a pointer comparison is performed at an interval of 8 ms, for the priority status queue a pointer comparison is performed at an interval of 16 ms, and for the non-priority status queue a pointer comparison is performed at an interval of 80 ms.

Step S47: When these two pointers are different, because a new set of status data is written into a status queue, the BSGC 11 reads the status data from the status queue.

FIG. 8A is an explanatory diagram illustrating termination data.

More specifically, FIG. 8A shows the storage area in the main memory 10a of the BCPR 10 shown in FIG. 6 for storing termination data indicating the acceptance or rejection of each command belonging to the command group by the BSGC 11.

It is assumed here that the storage area for termination data stores two words each comprising 32 bytes, that BSGC 11 writes into the storage area binary "0" for the acceptance or binary "1" for the rejection of each of 64 commands.

FIG. 8B is an explanatory diagram illustrating a command format.

More specifically, FIG. 8B shows that each command comprises four [4] words, where a first word stores "CD" (chain data, indicating the presence or absence of designated chain data as a command function), "BC" (a buffer command, indicating whether a buffer is needed or not), "APID" (an application identification)", "command" (a command type) and "command ID" (a command identifier); whereas second third and fourth words store command parameters 1, 2 and 3, respectively. (Refer to FIG. 9 for further detail.)

FIG. 9 is an explanatory diagram illustrating a command function.

A command may have a content of more than four words. For example, when a command has a content of no less than five words because of many parameters, a field name "chain data (CD)" indicates the continuation to a next command by a content "with a chain data designation (1)". A field name "buffer command (BC)" indicates that the receiving side of a command accompanied by data needs to have a buffer ready by a content "with a buffer (1)". A field name "APID" designates an application type of the command. A field name "command" designates a command type. A field name "command ID" designates a command identifier in a command execution status report. A field name "parameters 1, 2 and 3" designates command parameters comprising a link number, a transmission buffer pointer and a message length.

FIG. 10 is an explanatory diagram illustrating a concrete example of a command.

More specifically, FIG. 10 shows command types such as device controls and peripheral interface (PIF) controls, item numbers for respective command types, command names, command values, operational outlines, and command abbreviations.

FIG. 11 is a format diagram illustrating the format of status data.

As with FIG. 8B showing a command format, FIG. 8B shows that each set of status data comprises four words, where a first word stores "CD" (chain data, indicating the presence of absence of designated chain data as a command function), "BC" (a buffer command, indicating whether a buffer is needed or not ), "APID" (an application identification)", "status" (a status data type) and "command ID" (a corresponding command identifier); whereas second, third and fourth words store command parameters 1, 2 and 3, respectively. (Refer to FIG. 12 for further detail.)

FIG. 12 is an explanatory diagram illustrating a status data function.

FIG. 12 is basically different from FIG. 9 only in a "command ID". Upon transferring as status data a result of executing a command received from the BCPR 10, the BSGC 11 uses the command ID of the executed command. The BSGC 11 uses binary "0" as a command ID e.g. for transferring to the BCPR 10 a message received from either of the remote terminals 13-1 and 13-2 shown in FIG. 2.

FIG. 13 is an explanatory diagram illustrating a concrete example of status data.

More specifically, FIG. 13 shows status types such as device controls and peripheral interface (PIF) controls, item numbers for respective status types, status names, status values, operational outlines, and status abbreviations.

Figure 14:
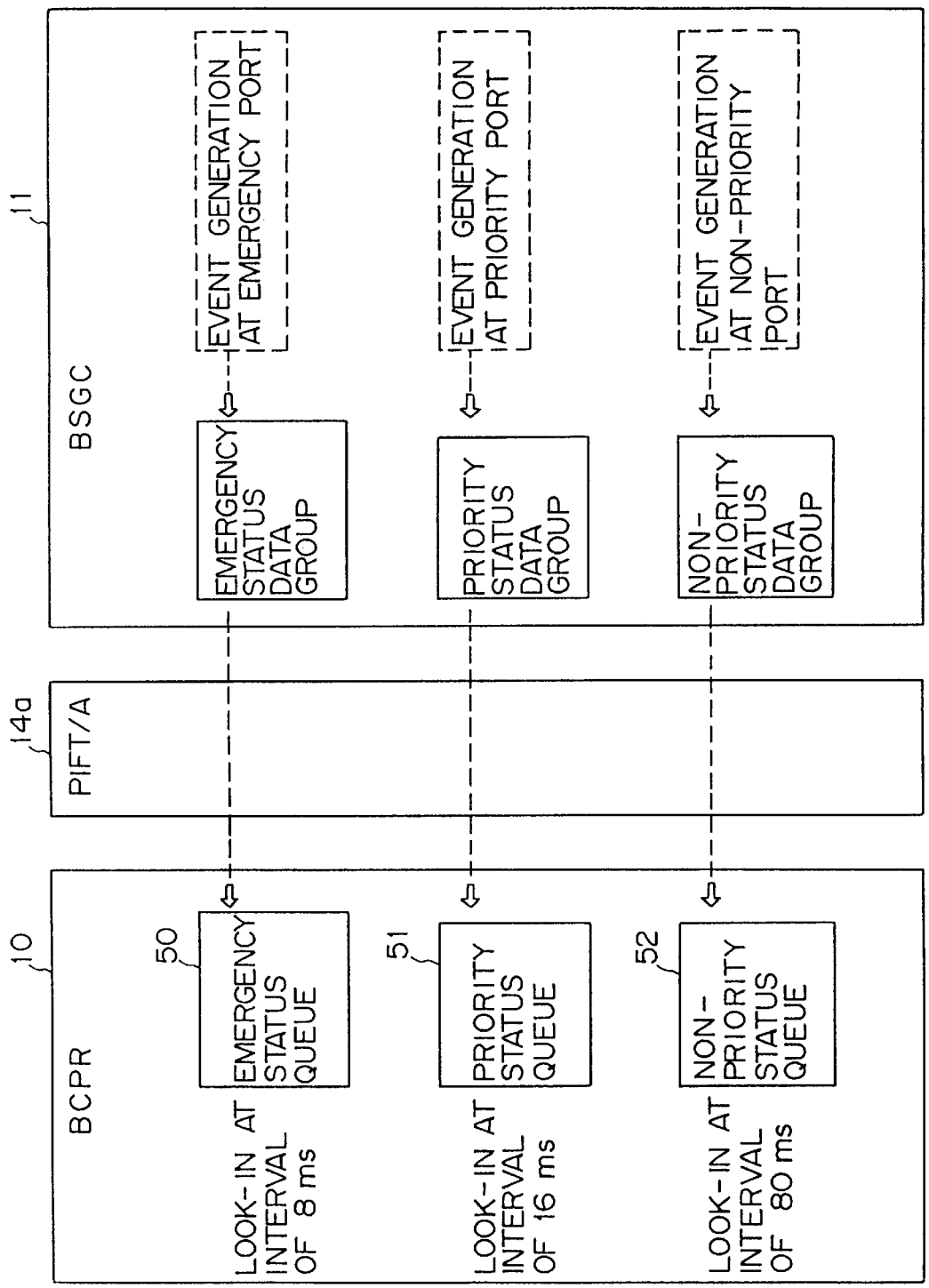
FIG. 14 is an explanatory diagram illustrating three status queues, comprising an emergency status queue, a priority status queue and a non-priority status queue, in a call processor.

FIG. 14 shows three status queues, comprising an emergency status queue, a priority status queue and a non-priority status queue, provided in the main memory 10a of the BCPR 10.

The BSGC 11 DMA transfers via the PIFT/A 14a, an emergency status data group as an aggregate of events generated at an emergency port to an emergency status queue 50, a priority status data group as an aggregate of events generated at a priority port to a priority status queue 51, and a non-priority status data group as an aggregate of events generated at a non-priority port to a non-priority status queue 52. The BSGC 11 combines each of these status data groups e.g. at an interval of 8 ms, and transfers it to the corresponding one of the three status queues in the sequence of the emergency status data group, the priority status data group and the non-priority status data group.

The BCPR 10 looks in or scans a content of the emergency status queue 50 at an interval of 8 ms, a content of the priority status queue 51 at an interval of 16 ms, a content of the non-priority status queue 52 at an interval of 80 ms, thereby earliest detecting the content of emergency status queue 50. Data stored in the emergency status queue 50 include fault data from an emergency port. Data stored in the priority status queue 51 include call control data from a subscriber control port, which is a priority port. Data stored in the non-priority status queue 52 include traffic data and charge data from an intra-office communications port, which is a non-priority port.

Figure 15:
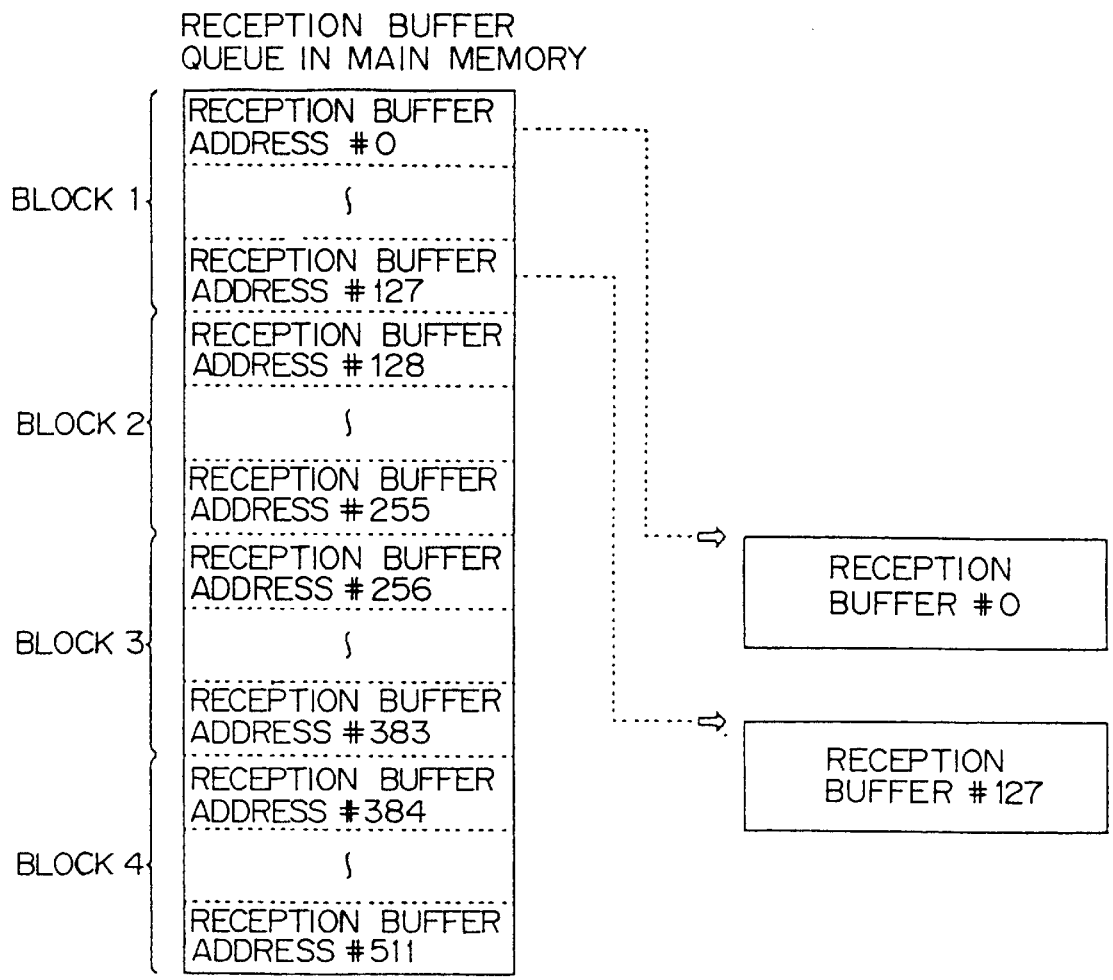
FIG. 15 is an explanatory diagram illustrating a reception buffer queue in the main memory of a call processor.

FIG. 15 shows a reception buffer queue for storing reception buffer addresses in the main memory 10a of the BCPR 10, at which data received from the BSGC 11 are stored in addition to in the three status queues described earlier.

As described earlier, data stored in a status queue has no more than four words, each word comprising 32 bits. Because a status queue cannot store data of a larger capacity, a reception buffer stores data of a large capacity. A reception buffer queue designates the head end address of a reception buffer.

A reception buffer is separated e.g. into four [4] blocks, each block comprising one hundred and twenty-eight [128] reception buffer areas. A reception buffer queue stores the head address of a corresponding reception buffer area. A reception buffer itself is provided in the main memory 10a.

Upon initialization, the BSGC 11 receives from the BCPR 10 reception buffer addresses of two [2] blocks, e.g. block 1 and block 2, of reception buffer ques. Based on the reception buffer addresses, by sequentially using the reception buffers, the BSGC 11 notifies the BCPR 10 of data transmitted e.g. from either of the remote terminals 13-1 and 13-2. That is, the BSGC 11 DMA writes data into reception buffers by sequentially using them from a reception buffer #0.

After using all of 128 reception buffer areas in one block, e.g. block 1, of a reception buffer queue, the BCPR 10 notifies the BSGC 11 of the reception buffer addresses in block 3 by using a reception buffer registration command. That is, the BCPR 10 constantly notifies the BSGC 11 of reception buffer addresses in two blocks, and the BSGC 11 DMA writes data sequentially into reception buffers by using reception buffer addresses of two blocks. The BCPR 10 notifies the BSGC 11 of reception buffer addresses cyclically from those in block 1 to those in block 4 of a reception buffer queue and the BSGC 11 uses the received reception buffer addresses.

Figure 16:
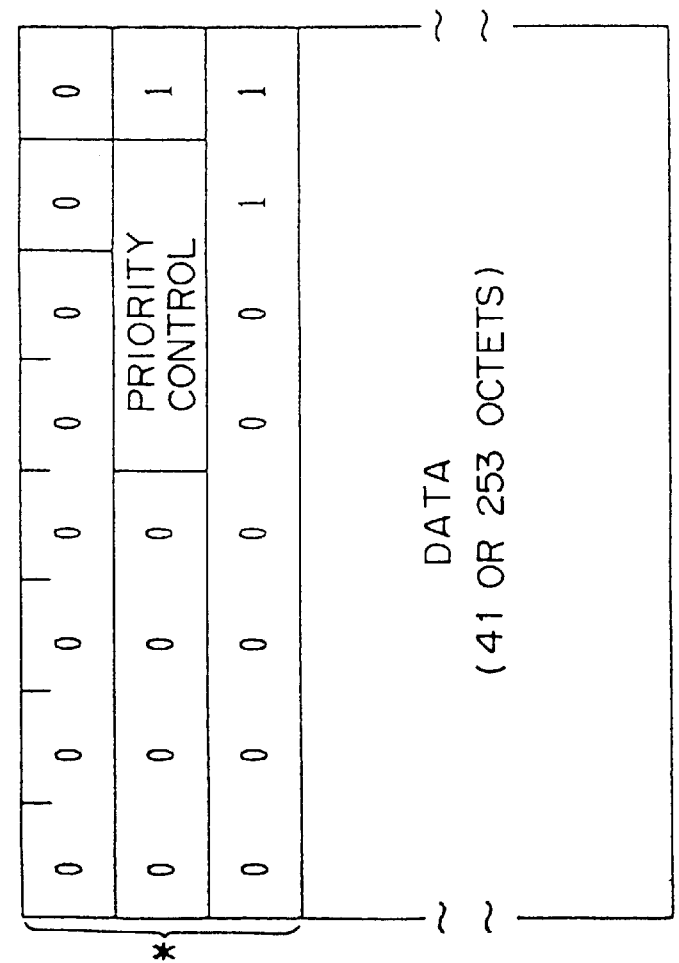
FIG. 16 is an explanatory diagram illustrating priority control bits in the header of an ATM cell.

FIG. 16 shows priority control bits stored in the payload area of the header of an ATM cell transmitted from either of the remote terminals 13-1 and 13-2 via the ATM switch 12 to the BSGC 11 shown in FIG. 2.

Priority control bits indicate whether the BSGC 11 should transmit to the BCPR 10 the content of an ATM cell shown in FIG. 14 in an emergency status, a priority status or a non-priority status. The priority control bits comprise three bits. Their value indicates a status in which the BSGC 11 transmits an ATM cell to the BCPR 10. Binary "000" indicates an emergency status, binary "001" indicates a priority status, and binary "010" indicates a non-priority status. As well, binary "011" indicates that the BCPR 10 need not perform a software look-in.

This invention causes the BSGC 11 transmit to the BCPR 10 as an interruption status data having the degree of a status data priority higher than that of emergency status data in the emergency status queue 50 shown in FIG. 14, which the BCPR 10 detects by a look-in at an interval of 8 ms.

Figure 17:
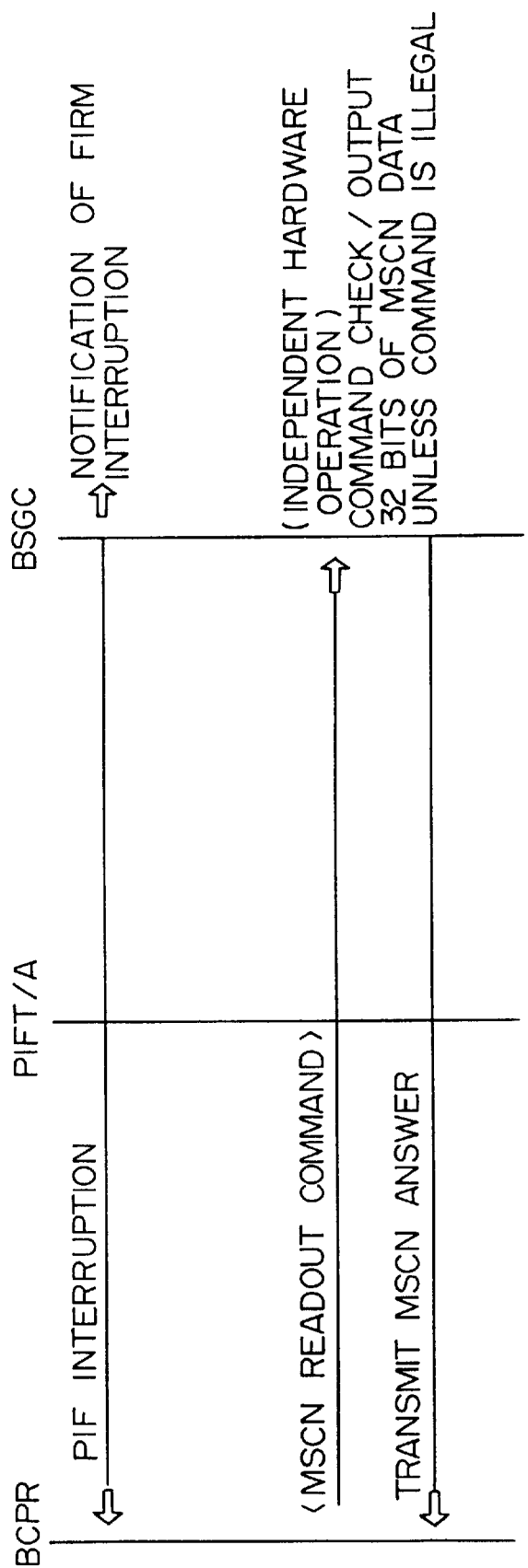
FIG. 17 is an explanatory diagram illustrating an interruption process from a communications control device to a call processor.

FIG. 17 shows an interruption process the BSGC 11 performs on the BCPR 10.

When the processor of the BSGC 11 experiences a severe fault, for example, the BSGC 11 notifies its firmware inside the BSGC 11 of the fault as a firm interruption. The BSGC 11 also notifies the BCPR 10 of the fault as a peripheral interface (PIF) interruption. In correspondence with the PIF interruption, the BCPR 10 transmits to the BSGC 11 a command for reading out MSCN (Maintenance Scanner) data indicating a specific fault part. The BSGC 11 checks the command by an independent hardware operation, and outputs, unless it is an illegal command, 32 bits of MSCN (Maintenance Scanner) data for a transmission as its MSCN answer to the BCPR 10.

FIG. 18 shows an example of 32 bits of MSCN data stored in the BSGC 11, which indicate the type and location of a fault.

Figure 19:
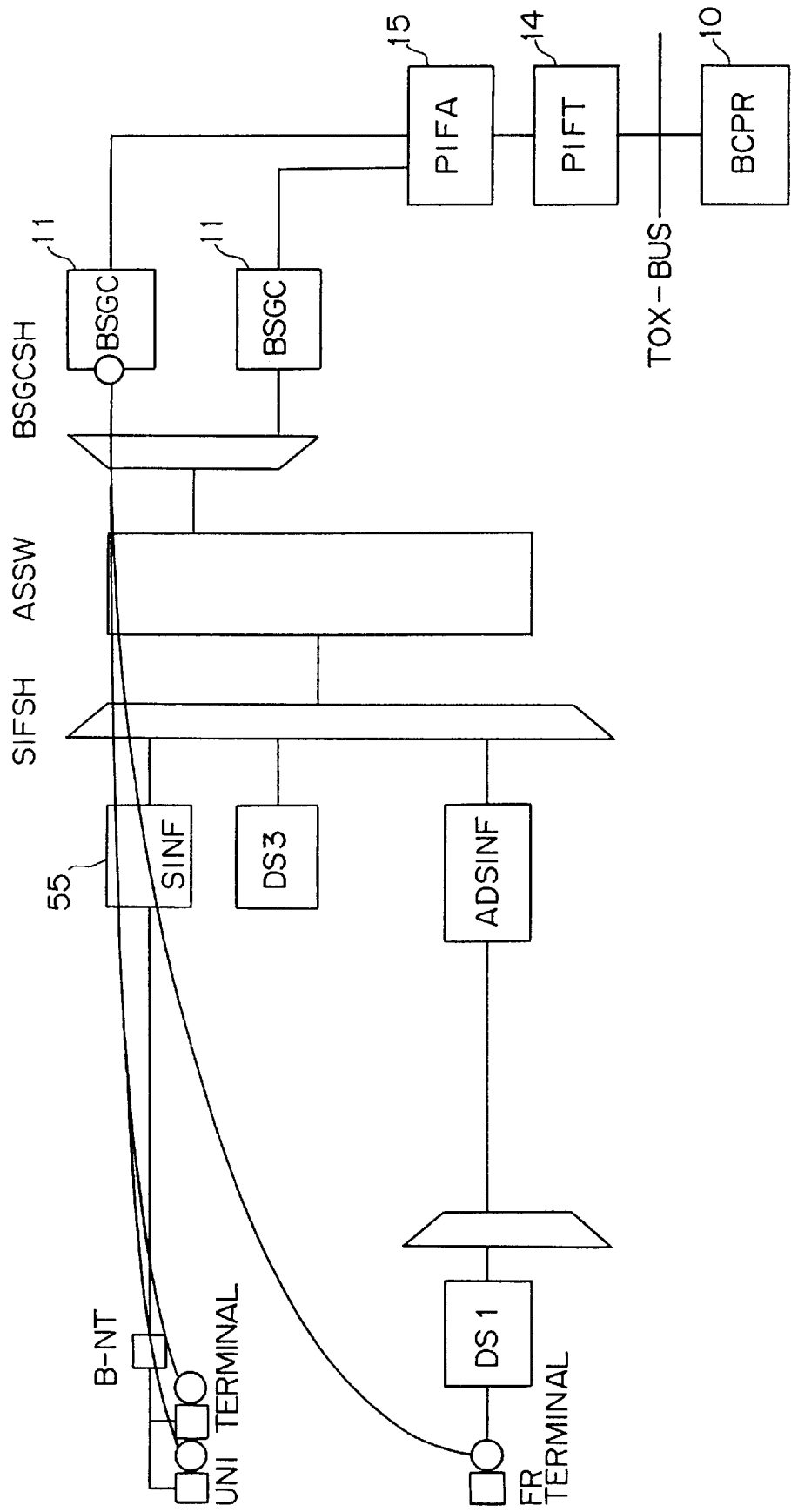
FIG. 19 is a first block diagram illustrating a detailed configuration of an ATM switch system using an inter-processor communications control system of this invention.

FIG. 19 is a first block diagram illustrating a detailed configuration of an ATM switch system using an interprocessor communications control system of this invention.

Figure 20:
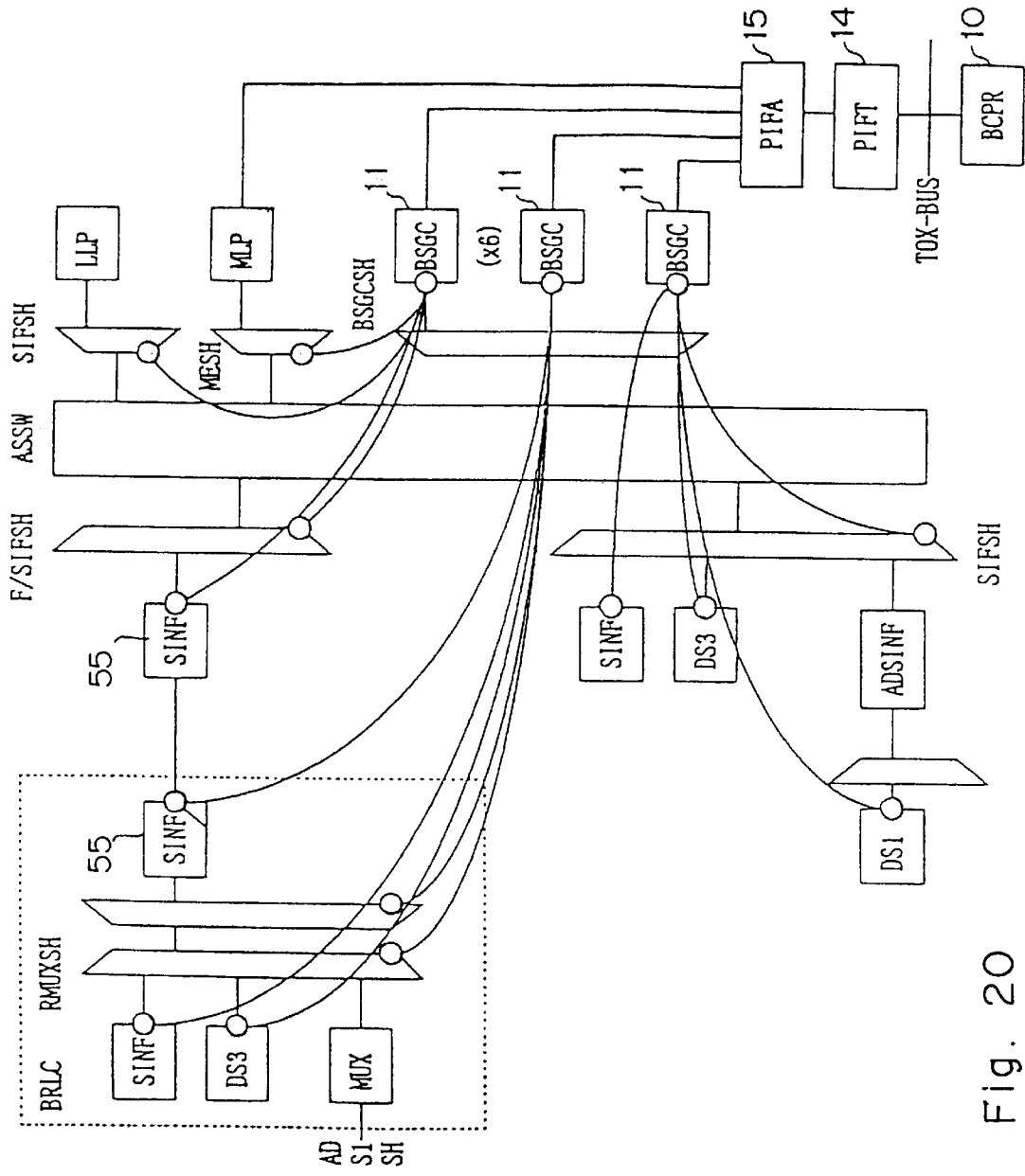
FIG. 20 is a second block diagram illustrating detailed configuration of an ATM switch system using an inter-processor communications control system of this invention.

FIG. 20 is a second block diagram illustrating a detailed configuration of an ATM switch system using an interprocessor communications control system of this invention.

The BCPR 10 performs inter-processor communications with plural BSGC's 11. As well, a BSGC 11 performs ATM cell based communications with a subscriber interface (SINF) 55 which serves as a concrete example of either of the remote terminals 13-1 and 13-2 shown in FIG. 2.

A DS1 is an abbreviation of a digital signal level 1. A DS3 is an abbreviation of a digital signal level 3. An LLP is an abbreviation of a line loop unit. An MH is an abbreviation of a message handler. An ASSW is an abbreviation of an ATM subscriber switch. An ADSINF is an abbreviation of an ATMDS1 shelf interface card. An SIFSH is an abbreviation of a subscriber interface shelf. A BSGCSH is an abbreviation of a broadband signal controller shelf. A TOX-BUS is an abbreviation of a toron extended bus.

Figure 21:
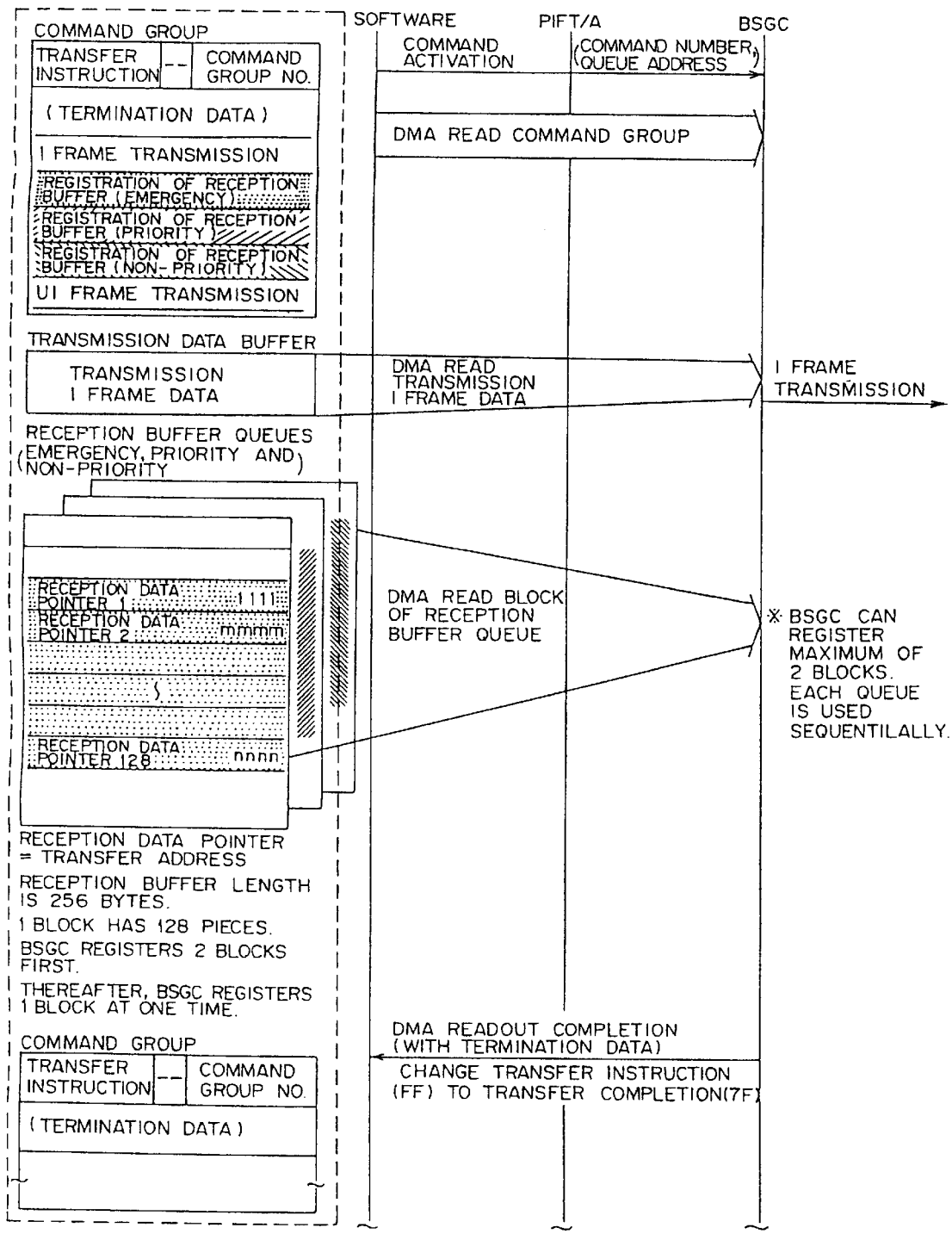
FIG. 21 is an explanatory diagram illustrating the transfer to a communications control device of a command group and reception buffer addresses in a reception buffer queue.

FIG. 21 shows the sequences of transferring a command group and reception buffer addresses from the BCPR 10 to the BSGC 11.

First, BSGC 11 reads through a DMA operation (DMA reads) a command group from the main memory 10a of the BCPR 10. Second, the BSGC 11 reads reception data pointers for two blocks corresponding to reception buffer addresses in a reception buffer queue. Third, the BSGC 11 writes through a DMA operation (DMA writes) into the main memory 10a of the BCPR 10 termination data indicating the acceptability of each command belonging to the read-in command group. It is assumed here that three types of reception buffers, which are an emergency buffer, a priority buffer and a non-priority buffer, are provided.

Figure 22:
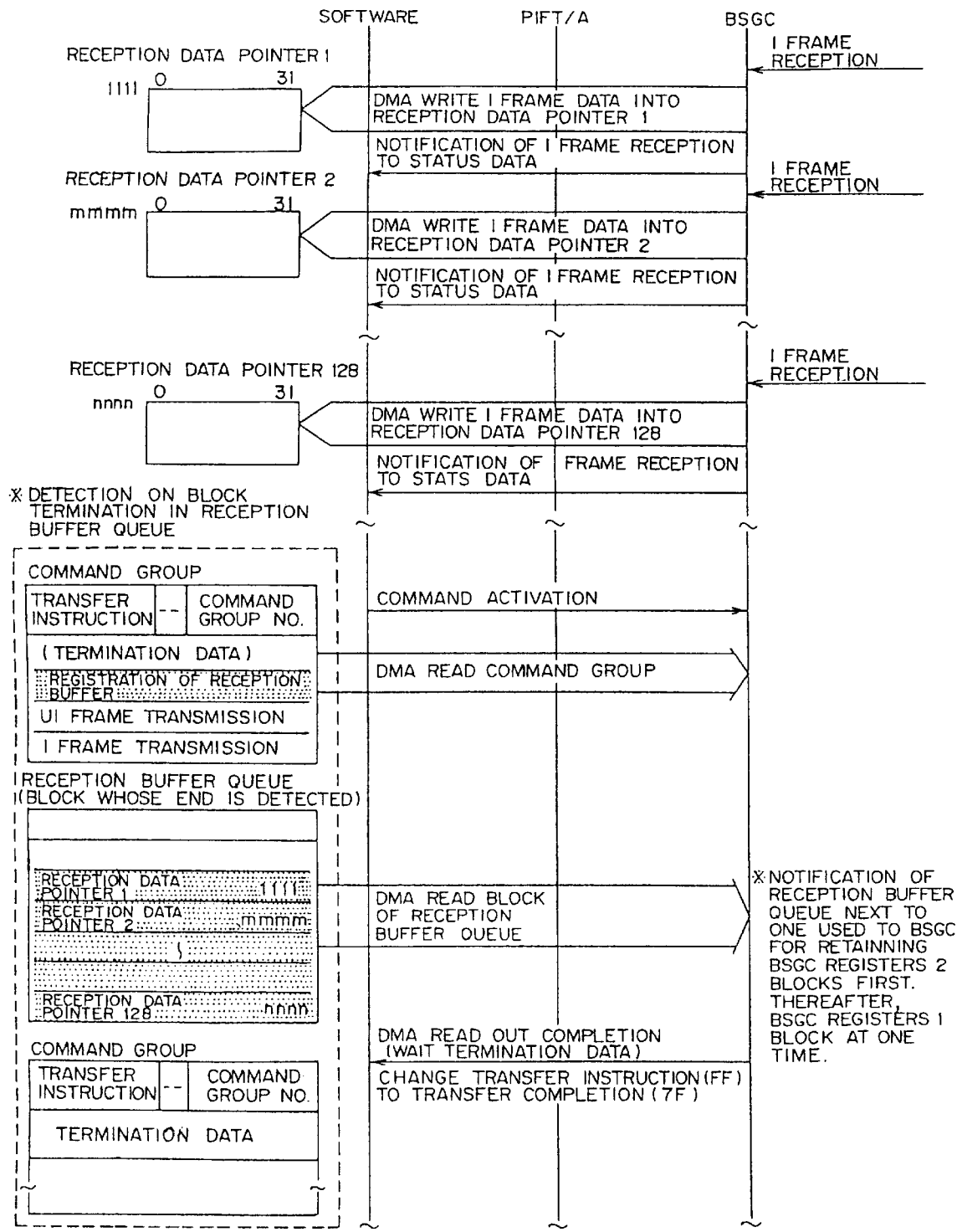
FIG. 22 is an explanatory diagram illustrating a reception data write-in from a communications control device to a reception buffer and a readout of reception buffer addresses of a next block to the communications control device.

FIG. 22 shows the sequence of storing reception data e.g. received from remote terminal 13-1 in the reception buffer of the main memory 10a in the BCPR 10, and the sequence of notifying the BSGC 11 of the reception buffer addresses of a next block.

First, data received from remote terminal 13-1 are written into a reception buffer designated by the reception data pointer corresponding to a reception buffer address. Then, upon detecting the end of one block in a reception buffer queue, the BSGC 11 DMA reads, in correspondence with a reception buffer registration command, reception data pointers corresponding respectively to reception buffer addresses which are the content of a next block in a reception buffer queue, and DMA writes into the BCPR 10 termination data indicating an acceptability corresponding to the reception buffer registration command, thereby ending the sequence.

As described above in detail, this invention enables a single DMA transfer to transfer, as a command group, plural commands between two processors, as well as termination data indicating the acceptance or rejection of each command belonging to the command group, thereby reducing the number of command transfers between two processors. Also, this invention enables a single DMA transfer to transfer, as a status data group, plural sets of status data in a similar manner. And status data having a higher degree of a status data priority can be detected earlier by changing the cycle of detecting status data in accordance with the degree of a status data priority. Further, this invention improves a reliability for a fault process while transmitting a large amount of data such as charge data.

What is claimed is:

1. An inter-processor communications control system between first and second processors, in which:

a first processor comprises command group storage means for storing a command group having a plurality of commands to be transmitted to said second processor and activation means for sending a command activation order including address information of said command group, said address information specifying at least one area storing said command group; and a second processor comprises transfer control means for receiving said command activation order and for controlling an access to said command group storage means, and command group readout means for reading in a batch said command group stored in said command group storage means by using said address information in said command activation order from said first processor.

2. An inter-processor communications control system between first and second processors, in which:

a first processor comprises command group storage means for storing a command group having a plurality of commands to be transmitted to said second processor and activation means for sending a command activation order including address information of said command group, said address information specifying at least one area storing said command group; and a second processor comprises transfer control means for receiving said command activation order and for controlling an inter-processor transfer and command group readout means for reading in a batch said command group stored in said command group storage means by using said address information in said command activation order from said first processor wherein said second processor further comprises command group reception result notification means for notifying said first processor whether or not a command belonging to said command group read from said command group storage means is acceptable by a bit map corresponding to said plurality of commands.

3. An inter-processor communications control system between first and second processors, in which:

a first processor comprises command group storage means for storing a command group having a plurality of commands to be transmitted to said second processor and activation means for sending a command activation order including address information of said command group, said address information specifying at least one area storing said command group; and a second processor comprises transfer control means for receiving said command activation order and for controlling an inter-processor transfer, and command group readout means for reading in a batch said command group stored in said command group storage means by using said address information in said command activation order from said first processor wherein said command group storage means is provided inside of a main memory of said first processor; and said command group readout means comprises direct memory access control means for directly accessing said main memory.

4. An inter-processor communications control system between first and second processors, in which:

said first processor comprises status data storage means for storing no less than one set of status data transmitted from said second processor including a result of executing a command transmitted from said first processor to said second processor; and said second processor comprises transfer control means for receiving address information which specifies at least one area in said status data storage means and for controlling an access to said status data storage means, and status data group write-in means for writing in a batch said no less than one set of status data into said status data storage means, combining said no less than one set of status data to be transmitted to said first processor as a status data group and using said address information as information of an area into which said status data group is to be written.

5. An inter-processor communications control system between first and second processors, in which:

said first processor comprises status data storage means for storing no less than one set of status data transmitted from said second processor including a result of executing a command transmitted from said first processor to said second processor; and said second processor comprises transfer control means for receiving address information which specifies at least one area in said status data storage means and for controlling an inter-processor transfer, and status data group write-in means for writing in a batch said no less than one set of status data into said status data storage means, combining said no less than one set of status data to be transmitted to said first processor as a status data group and using said address information as information of an area into which said status data group is to be written;

wherein said no less than one set of status data forming said status data group written in a batch by said status data group write-in means provided in said second processor is status data generated in a predetermined duration in said second processor.

6. An inter-processor communications control system between first and second processors, in which:

said first processor comprises status data storage means for storing no less than one set of status data transmitted from said second processor including a result of executing a command transmitted from said first processor to said second processor;

said second processor comprises transfer control means for receiving address information which specifies at least one area in said status data storage means and for controlling an inter-processor transfer and status data group write-in means for writing in a batch said no less than one set of status data into said status data storage means, combining said no less than one set of status data to be transmitted to said first processor as a status data group and using said address information as information of an area into which said status data group is to be written;

wherein status data storage means provided in said first processor comprises a plurality of status queues having specified priorities; and said status data group write-in means provided in said second processor writes said status data group into one of said plurality of status queues, in accordance with a priority of said status data group to be transmitted to said first processor.

7. The inter-processor communications control system according to claim 6, wherein:

said no less than one set of status data forming said status data group written in a batch in each of said plurality of status queues by said status data group write-in means provided in said second processor are status data generated in said second processor in a duration predetermined in correspondence with said each of said plurality of status queues.

8. The inter-processor communications control system according to claim 6, wherein:

said status data storage means provided in said first processor further comprises a reception buffer for a status notification, said reception buffer for storing status data having a capacity too large to be stored in said one of said plurality of status queues, in addition to said plurality of status queues.

9. The inter-processor communications control system according to claim 8, wherein:

said first processor, by notifying said second processor of a head address and a length of said reception buffer, performs a block control on said reception buffer, thereby reducing number of transferring control data between said first processor and said second processor.

10. The inter-processor communications control system according to claim 6, wherein:

said second processor further comprises a local device under control;

said local device specifies said priority of said status data group in header data of a signal transmitted to said second processor; and said status data group write-in means in said second processor writes status data corresponding to said signal into said one of said plurality of status queues, in accordance with said priority specified in said header data.

11. The inter-processor communications control system according to claim 6, wherein:

said second processor notifies by an interruption said first processor of status data having a priority higher than said specified priorities of said plurality of status queues.

12. An inter-processor communications control system between first and second processors, in which:

said first processor comprises status data storage means for storing no less than one set of status data transmitted from said second processor including a result of executing a command transmitted from said first processor to said second processor;

said second processor comprises transfer control means for receiving address information which specifies at least one area in said status data storage means and for controlling an inter-processor transfer, and status data group write-in means for writing in a batch said no less than one set of status data into said status data storage means, combining said no less than one set of status data to be transmitted to said first processor as a status data group and using said address information as information of an area into which said status data group is to be written;

wherein said status data storage means is provided inside of a main memory of said first processor; and said status data write-in means comprises a direct memory access control means for directly accessing said main memory.

13. An inter-processor communications control method for use between first and second processors comprising:

a step of having said first processor generate a command group comprising a plurality of commands to be transmitted to said second processor;

a step of having said first processor transmit a command activation order including address information of said command group to said second processor, said address information specifying at least one area storing said command group;

a step of having said second processor receive said command activation order;

a step of having said second processor control an access to said command group; and a step of having said second processor read said command group in a batch by using said address information in said command activation order.

14. An inter-processor communications control method for use between first and second processors comprising:

a step of providing in said first processor at least one storage area for storing no less than one set of status data including a result of executing a command transmitted from said first processor to said second processor;

a step of having said second processor generate a status data group comprising said no less than one set of status data to be transmitted to said first processor;

a step of having said second processor receive address information which specifies said at least one storage area in said first processor;

a step of having said second processor control an inter-processor transfer; and a step of having said second processor write said status data group in a batch into said storage area using said address information as information of an area into which said status data group is to be written.

15. An inter-processor communications control system between first and second processors, in which:

a first processor comprises command group storage means for storing a command group having a plurality of commands to be transmitted to said second processor and activation means for sending a command activation order including address information of said command group, said address information specifying at least one area storing said command group; and a second processor comprises transfer control means for receiving said command activation order and for controlling an access to said command group storage means, and command group readout means for reading in a single transfer said command group stored in said command group storage means by using said address information in said command activation order from said first processor.

16. An inter-processor communications control system between first and second processors in which:

said first processor comprises status data storage means for storing no less than one set of status data transmitted from said second processor including a result of executing a command transmitted from said first processor to said second processor; and said second processor comprises transfer control means for receiving address information which specifies at least one area in said status data storage means and for controlling an access to said status data storage means, and status data group write-in means for writing in a single transfer said no less than one set of status data into said status data storage means, combining said no less than one set of status data to be transmitted to said first processor as a status data group and using said address information as information of an area into which said status data group is to be written.

17. An inter-processor communications control method for use between first and second processors comprising:

a step of having said first processor generate a command group comprising a plurality of commands to be transmitted to said second processor;

a step of having said first processor transmit a command activation order including address information of said command group to said second processor, said address information specifying at least one area storing said command group;

a step of having said second processor receive said command activation order;

a step of having said second processor control an access to said command group; and a step of having said second processor read said command group in a single transfer by using said address information in said command activation order.

18. An inter-processor communications control method for use between first and second processors comprising:

a step of providing in said first processor at least one storage area for storing no less than one set of status data including a result of executing a command transmitted from said first processor to said second processor;

a step of having said second processor generate a status data group comprising said no less than one set of status data to be transmitted to said first processor;

a step of having said second processor receive address information which specifies said at least one storage area in said first processor;

a step of having said second processor control an access to said storage area; and a step of having said second processor write said status data group in a single transfer into said storage area and using said address information as information of an area into which said status data group is to be written.

* * * * *